United States Patent [19]
Sennewald et al.

[11] 3,781,193
[45] Dec. 25, 1973

[54] PROCESS FOR ISOLATING ACRYLIC ACID FROM AQUEOUS CRUDE ACRYLIC ACID BY DISTILLATIONS WITH 3,3,5-TRIMETHYCYCLOHEXAMONE AND THIN LAYER EVAPORATION

[75] Inventors: Kurt Sennewald; Heinz Erpenbach; Heinz Handte, all of Cologne; Georg Kohl, Hurth-Burbach; Winfried Lork, Erftstadt-Friesheim, all of Germany

[73] Assignee: Knapsack Aktiengesellschaft, Knapsack near Cologne, Germany

[22] Filed: Jan. 31, 1972

[21] Appl. No.: 222,003

[30] Foreign Application Priority Data
Feb. 1, 1971  Germany.................. P 21 04 506.7

[52] U.S. Cl.................. 203/8, 203/15, 203/62, 203/72, 203/80, 260/526 N
[51] Int. Cl..................... C07c 57/04, B01d 3/36
[58] Field of Search.................. 203/62, 72, 15, 80, 203/8; 260/526 N

[56] References Cited
UNITED STATES PATENTS

| | | | |
|---|---|---|---|
| 3,657,332 | 4/1972 | Sennewald et al. | 203/15 |
| 3,692,829 | 9/1972 | Sennewald et al. | 260/526 N |
| 3,689,541 | 9/1972 | Sennewald et al. | 260/526 N |
| 3,329,582 | 7/1967 | Sennewald et al. | 203/72 |
| 3,420,750 | 1/1969 | Schaefer et al. | 203/72 |
| 3,476,656 | 11/1969 | Van Tassell et al. | 203/72 |

*Primary Examiner*—Wilbur L. Bascomb, Jr.
*Attorney*—Arthur G. Connolly et al.

[57] ABSTRACT

Acrylic acid and acetic acid are isolated from aqueous crude acrylic acid containing acrylic acid and acetic acid and contaminated with minor proportions of formaldehyde and higher boiling constituents, such as maleic acid and polymeric acrylic acid, by subjecting the aqueous crude acrylic acid to extractive azeotropic distillation in the presence of a distillation aid. More particularly the aqueous crude acrylic acid is distilled in a first distilling column in the presence of 3,3,5-trimethylcyclohexanone as the distillation aid under a pressure between 20 and 80 mm mercury; an azeotrope of 3,3,5-trimethylcyclohexanone and water and the bulk of the formaldehyde are removed near the head of the column and acrylic acid, acetic acid and minor proportions of distilling aid, residual formaldehyde and higher boiling constituents are obtained in the column's base portion; the base product coming from the first distilling column is delivered to a second distilling column and distilled therein under a pressure between about 20 and 80 mm mercury while obtaining, as the distillation residue, acrylic acid free from acetic acid, distilling aid and higher boiling constituents; the distillation residue coming from the second distilling column is delivered to a thin layer evaporator and the acrylic acid together with the distilling aid are evaporated therein under a pressure between 20 and 80 mm mercury so as to free the acrylic acid from the said higher boiling constituents; acrylic acid in vapor form escaping at the head of the thin layer evaporator and contaminated with distilling aid is introduced into a third distilling column and separation firstly into acrylic acid and secondly into distilling aid is effected therein under a pressure between about 20 and 60 mm mercury.

13 Claims, 1 Drawing Figure

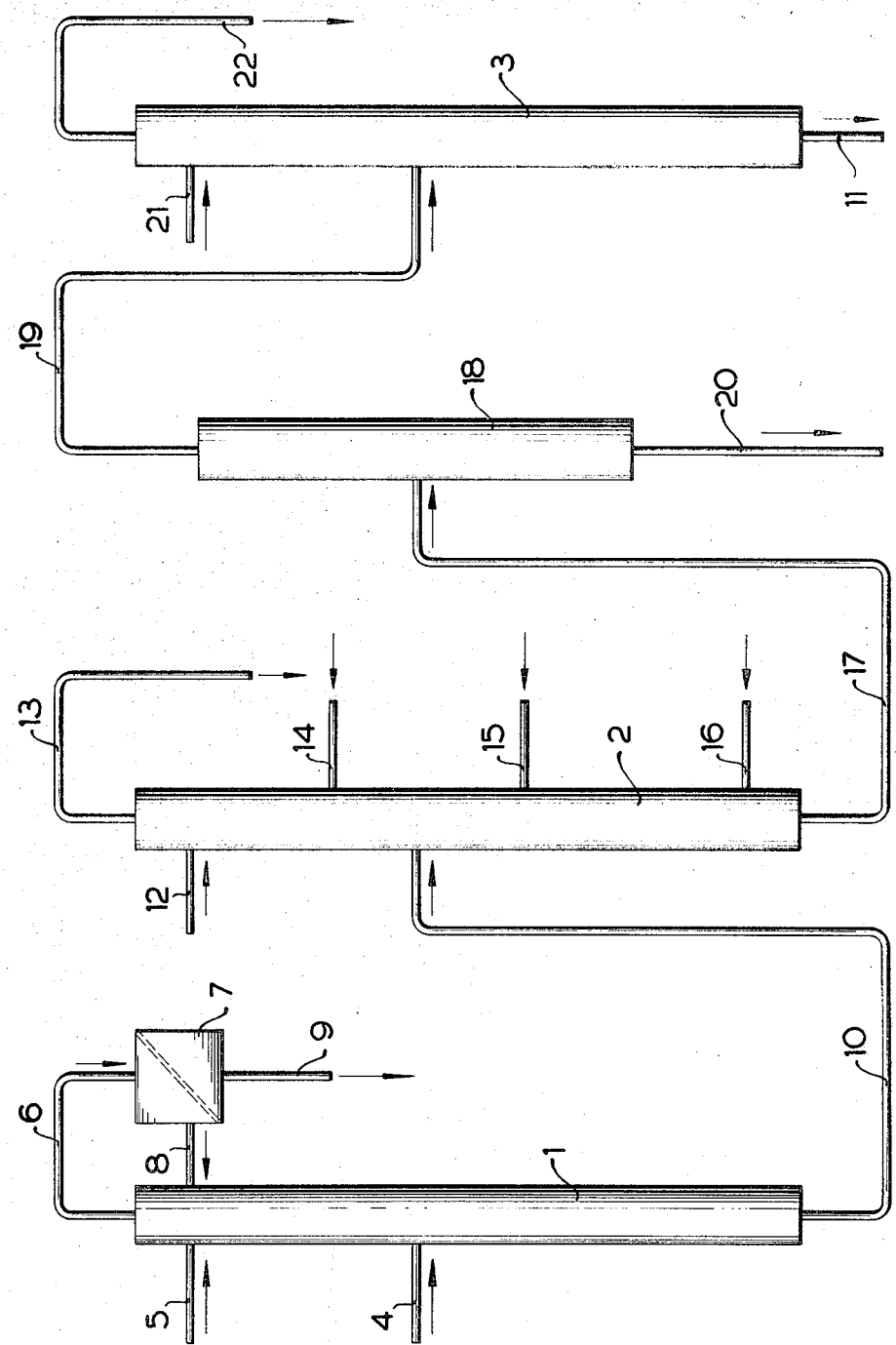

PROCESS FOR ISOLATING ACRYLIC ACID FROM AQUEOUS CRUDE ACRYLIC ACID BY DISTILLATIONS WITH 3,3,5-TRIMETHYCYCLOHEXAMONE AND THIN LAYER EVAPORATION

The present invention relates to a process for isolating acrylic acid from aqueous crude acrylic acid containing acrylic acid together with acetic acid and minor proportions of formaldehyde, maleic acid and polymeric acrylic acid, by subjecting the crude acid to azeotropic distillation.

Crude acrylic acid is obtained, for example, in the catalytic oxidation of propylene in gas phase, and it may contain between about 10 and 50 weight percent of acrylic acid, between 1 and 8 weight percent of acetic acid and minor proportions of formaldehyde, maleic acid and polymeric acrylic acid. Various processes for isolating pure acrylic acid from such crude acrylic acid have already been described. These earlier processes comprise subjecting the crude acid to extractive or distillative treatment, or to a combined extractive and distillative treatment.

British Pat. No. 1 235 634, for example, describes a process for isolating pure acrylic acid from crude acrylic acid, wherein the aqueous crude acid is extracted with the use of 3,3,5-trimethylcyclohexanone and/or isophorone, and the resulting extract is simultaneously washed with water. Following this, the organic extract is dehydrated in a first distilling stage and base product coming from the first distilling stage is delivered to a second distilling stage, in which pure acrylic acid is distilled off. While this process enables acrylic acid to be obtained in a yield of 97 percent of the theoretical, the fact remains that it is not fully satisfactory. The crude acrylic acid contains acetic acid in a proportion between about 8 and 15 weight percent, based on the quantity of acrylic acid produced. On carrying out the extraction, this acetic acid goes into the waste effluent in which it appears in rather dilute form, for example in a concentration between 1 and 2 weight percent, together with further organic impurities. The biological treatment of such waste effluent in compliance with the requirements of the pollution legislation of the various countries is a very costly procedure. Considerable technical expenditure and additional costs are incurred by the possible recovery of the acetic acid.

The process reported in German DOS 1 568 022, which relates to the purification of crude acrylic acid and which combines the extraction of the crude acid with the azeotropic distillation of the resulting organic extract, also does not provide a solution for the waste effluent problem. As would appear from page 11 of the above DOS, the acetic acid is again obtained in the form of a dilute aqueous solution which naturally involves problems the same as those referred to hereinabove.

A further process for isolating acrylic acid from an aqueous solution containing acrylic acid and acetic acid has been reported in German DOS 1 950 750, wherein the aqueous solution is subjected to azeotropic distillation in the presence of butyl acetate, ethyl butyrate, ethyl isobutyrate and similar compounds, which are used as a distilling aid. The head product of the distilling column is an azeotrope comprising acetic acid, water and distilling aid and the base or sump product is substantially pure acrylic acid. In aqueous phase, the head product contains acetic acid in a concentration of approximately 9 weight percent. It is accordingly necessary, as in the processes first described hereinabove, to concentrate the acetic acid in a further distilling stage, for example by subjecting the aqueous solution to azeotropic distillation in the presence of butyl acetate. Apart from the fact that it is necessary for the acetic acid to be further processed in a separate operation, this latter process is an energetically disadvantageous procedure. This in view of the fact that the quantity of water introduced together with the crude acrylic acid into the purification process is subjected twice to distillation, namely once during the isolation of the acrylic acid, and once during the distillative work-up of the aqueous acetic acid-containing solution.

The present invention now provides a process permitting substantially all of the water present in the crude acrylic acid to be isolated as early as in the first distilling stage, and the acetic acid to be obtained in concentrated form in a following process step from the resulting mixture containing acrylic acid substantially together with acetic acid. As compared with earlier processes, it is unnecessary in the process of the present invention to receover acetic acid by subjecting it to separate purifying treatment.

The process of the present invention for isolating acrylic acid from aqueous crude acrylic acid containing acrylic acid and acetic acid and contaminated with minor proportions of formaldehyde and higher boiling constituents, such as maleic acid and polymeric acrylic acid, by subjecting the aqueous crude acrylic acid to extractive azeotropic distillation in the presence of a distillation aid, comprises more particularly distilling in a first distilling column the aqueous crude acrylic acid in the presence of 3,3,5-trimethylcyclohexanone as the distillation aid under a pressure between 20 and 80 mm mercury; removing near the column head an azeotrope of 3,3,5-trimethyl-cyclohexanone and water and removing the bulk of the formaldehyde, and producing in the column base a base product comprising acrylic acid, acetic acid and minor proportions of distilling aid, residual formaldehyde and higher boiling constituents; delivering the base product coming from the first distilling column to a second distilling column and distilling the said base product therein under a pressure between about 20 and 80 mm mercury while obtaining, as the distillate, substantially all of the acetic acid and residual formaldehyde and while obtaining, as the distillation residue, acrylic acid free from acetic acid, distilling aid and higher boiling constituents; delivering the distillation residue coming from the second distilling column to a thin layer evaporator and evaporating the acrylic acid together with the distilling aid therein under a pressure between 20 and 80 mm mercury so as to free the acrylic acid from the said higher boiling constituents; introducing, into a third distilling column, acrylic acid in vapor form escaping at the head of the thin layer evaporator and contaminated with distilling aid, and effecting, in said third distilling column, separation firstly into acrylic acid and secondly into distilling aid, under a pressure between about 20 and 60 mm mercury.

The aqueous acrylic acid, which can be purified by the process of the present invention, may contain, for example, between about 10 and 50 weight percent of acrylic acid, between about 1 and 8 weight percent of acetic acid, between about 0.5 and 1 weight percent of formaldehyde and between about 1 and 3 weight percent of higher boiling constituents.

To free the crude acrylic acid in the first distilling column from the water contained in it, it is necessary to use between about 40 and 50 weight percent of a distilling auxiliary, based on the quantity of water present in the crude acrylic acid. The distillation should be carried out under a preferred pressure between about 30 and 50 mm of mercury.

Following liquefaction, the azeotrope removed near the head of the first distilling column is delivered to a separator, wherein it is separated into an organic layer of distilling auxiliary and into an aqueous layer, and the organic layer is recycled to the head portion of the column, in which the organic acids are extracted. To stabilize the material in the first distilling column, it is good practice to add a solution of p-quinone and methanol in acetic acid to the feed material and to introduce a solution of p-quinone in trimethylcyclohexanone downstream of the column's head.

The base or sump product coming from the first distilling column is introduced into a second distilling column and freed therein from acetic acid, preferably under reduced pressure between about 30 and 50 mm of mercury. A good separating effect is produced if use is made of a reflux ratio of 12, in the second distilling column. In order to avoid polymerization of the acrylic acid while the acetic acid is distilled off, it is good practice to supply the column with a solution of p-quinone and methanol in acetic acid and with minor proportions of air.

The acrylic acid and distillation auxiliary can be freed under mild conditions from difficultly volatile constituents by effecting the evaporation in the thin layer evaporator under a pressure of about 40 mm of mercury.

A further preferred embodiment of the process of the present invention comprises distilling the acrylic acid in the third distilling column under a pressure of about 40 mm of mercury, at a reflux ratio of 2. Again, it is good practice to avoid polymerization of the acrylic acid by stabilizing the material present in the third distilling column, by the addition of a solution of p-quinone in acrylic acid.

As compared with earlier methods, the process of the present invention is a step forward in the art as it enables the crude acrylic acid to be dehydrated and the acetic acid to be isolated from the acrylic acid in simple manner. 3,3,5-trimethylcyclohexanone has been found to be a very good selective azeotrope former for water, the resulting azeotrope of trimethylcyclohexanone and water having a boiling point of 99°C under atmospheric pressure and containing 70 percent of water. The distilling auxiliary additionally produces an extractive effect relative to the acrylic acid and acetic acid. Following the selective dehydration of the crude acrylic acid, it is very easy to separate acetic acid therefrom by distillation. The acetic acid is obtained in a concentration of more than 90 weight percent and it is accordingly unnecessary to concentrate it in a separate process step, as in conventional processes. In addition thereto, purified acrylic acid with a purity of 99.8 percent is obtained in a yield of 98 percent, based on the quantity of crude acid used.

The proccess of the present invention will now be described with reference to the accompanying flow scheme in the following Example which illustrates the invention without limiting it thereto.

EXAMPLE

Distilling column 1 comprising 35 bubble trays was supplied continuously at the level of the 21st tray and through conduit 4 with 1 kg/hr of an aqueous crude acrylic acid composed of 45    weight percent of acrylic acid,
3    weight percent of acetic acid,
1    weight percent of formaldehyde,
2.5    weight percent of difficultly volatile constituents, the balance being water, and the crude acrylic acid was distilled therein in the presence of 3,3,5-trimethylcyclohexanone — briefly called TMC hereinafter — under a pressure of 40 mm of mercury and while maintaining a relfux ratio of 2. The TMC was introduced once into distilling column 1, namely at the start of the distillation process, and later cycled therein. The distillation was intended to effect the azeotropic dehydration of the crude acrylic acid, the TMC being used as a distilling auxiliary for the removal of water and for the extraction of the carboxylic acids. To avoid polymerization of the crude acrylic acid, the feed material (travelling through conduit 4) was mixed with 30 grams/hr of a solution of acetic acid, 0.5 weight percent of p-quinone and 3 weight percent of methanol. The material in the column was further stabilized by the addition of 40 grams/hr of a solution of 0.5 weight percent of p-quinone in TMC, which was introduced downstream of the column's head, through conduit 5. The head product removed through conduit 6 comprised an azeotropic mixture of water and TMC, and the bulk of the formaldehyde. Following condensation, it was separated into two layers in separator 7. The upper organic TMC layer was recycled through conduit 8 to distilling column 1 and used for the extraction of the organic acids. The lower water layer was removed through conduit 9 at an hourly rate of 487 grams. It contained 1.5 weight percent of formaldehyde and less than 0.1 weight percent of acrylic acid and acetic acid. The azeotropic dehydration effected the removal of more than 99 percent of the water initially present and of about 70 percent of the formaldehyde initially present, from the crude acrylic acid used. The sump or base product coming from distilling column 1, which substantially contained acrylic acid and acetic acid together with minor proportions of TMC, residue and residual formaldehyde, was delivered through conduit 10 to distilling column 2 comprising 45 theoretical trays and distilled therein under a pressure of 40 mm of mercury at a reflux ratio of 12, so as to separate the acetic acid and residual formaldehyde therefrom. The material in the column was stabilized by the addition, downstream of the column's head, of a mixture of 30 grams/hr of acetic acid, 0.15 gram/hr of p-quinone and 0.9 gram/hr of methanol travelling through conduit 12. The material in the column was further stabilized by the introduction of minor proportions of air travelling through feed lines 14, 15 and 16, into column 2. The head product of distilling column 2 obtained at an hourly rate of about 93 grams through conduit 13 was acetic acid with a strength of more than 90 percent, contaminated with 3 weight percent of formaldehyde, 1 weight percent of methanol and less than 1 weight percent of acrylic acid.

The sump or base product obtained in distilling column 2 was free from acetic acid. It contained acrylic acid as its principal constituent together with some TMC and difficultly volatile constituents. To free the acrylic acid from these difficultly volatile constituents, the sump or base product coming from distilling column 2 was conveyed through conduit 17 to thin layer evaporator 18 and evaporated therein under a pressure of 40 mm of mercury. The resulting acrylic acid and TMC vapors were passed through heated conduit 19 and introduced into series-connected distilling column 3 comprising 30 theoretical trays. The residue obtained in thin layer evaporator 18 — about 32 grams/hr — consisted of an acrylic acid polymer and higher boiling by-products originating from the production of acrylic acid by the oxidation of propylene. The residue was removed through conduit 20. In distilling column 3, the acrylic acid and TMC were separated from one another under reduced pressure of 40 mm of mercury at a reflux ratio of 2. The material in the column was stabilized by the addition of 30 cc/hr of a 0.5 weight percent solution of p-quinone in acrylic acid, through conduit 21. The distillative purification of the crude acrylic acid gave as the final product 472 grams/hr of acrylic acid with a purity of 99.8 percent, which was obtained as the distillate of column 3 and was removed through conduit 22. The acrylic acid was obtained as the distillate of column 3 and was removed through conduit 22. The acrylic acid was obtained in a yield of 98 percent, based on the quantity contained in the crude acid.

40 cc/hr of TMC, which was removed through conduit 11 and recycled, were obtained as the base or sump product of column 3.

We claim:

1. In the process for isolating acrylic acid and acetic acid from aqueous crude acrylic acid containing acrylic acid and acetic acid and contaminated with minor proportions of formaldehyde and higher boiling constituents, selected from the group consisting of maleic acid and polymeric acrylic acid, by subjecting the aqueous crude acrylic acid to extractive azeotropic distillation in the presence of a distillation aid, the improvement which comprises distilling in a first distilling column the aqueous crude acrylic acid in the presence of 3,3,5-trimethylcyclohexanone as the distillation aid under a pressure between 20 and 80 mm mercury; removing near the column head an azeotrope of 3,3,5-trimethylcyclohexanone and water and removing the bulk of the formaldehyde, and producing in the column base a base product comprising acrylic acid, acetic acid and minor proportions of distilling aid, residual formaldehyde and higher boiling constituents; delivering the base product coming from the first distilling column to a second distilling column and distilling the said base product therein under a pressure between about 20 and 80 mm mercury while obtaining, as the distillate, substantially all of the acetic acid and residual formaldehyde and while obtaining, as the distillation residue, acrylic acid free from acetic acid, distilling aid and higher boiling constituents; delivering the distillation residue coming from the second distilling column to a thin layer evaporator and evaporating the acrylic acid together with the distilling air therein under a pressure between 20 and 80 mm mercury so as to free the acrylic acid from the said higher boiling constituents; introducing, into a third distilling column, acrylic acid in vapor form escaping at the head of the thin layer evaporator and contaminated with distilling aid, and effecting, in said third distilling column, separation firstly into acrylic acid and secondly into distilling aid, under a pressure between about 20 and 60 mm mercury.

2. The process as claimed in claim 1, wherein the aqueous crude acrylic acid contains between about 10 and 50 weight percent of acrylic acid, between about 1 and 8 weight percent of acetic acid, between about 0.5 and 1 weight percent of formaldehyde and between about 1 and 3 weight percent of higher-boiling constituents.

3. The process as claimed in claim 1, wherein the distilling auxiliary is used in a proportion between about 40 and 50 weight percent, based on the quantity of water contained in the crude acrylic acid.

4. The process as claimed in claim 1, wherein the first distilling column is operated under a pressure between about 30 and 50 mm of mercury.

5. The process as claimed in claim 1, wherein the first distilling column is operated at an azeotrope reflux ration of about 2.

6. The process as claimed in claim 1, wherein the material in the first distilling column is stabilized by the addition of a solution of p-quinone and methanol in acetic acid to the feed material and by the addition, downstream of the column's head, of a solution of p-quinone in 3,3,5-trimethylcyclohexanone.

7. The process as claimed in claim 1, wherein, following liquefaction, the azeotrope removed near the head of the first distilling column is delivered to a separator and separated therein into an organic layer of distilling auxiliary and into an aqueous layer, the organic layer being recycled to the column's head portion.

8. The process as claimed in claim 1, wherein the second distilling column is operated under a pressure between about 30 and 50 mm of mercury.

9. The process as claimed in claim 1, wherein the second distilling column is operated at a reflux ratio of about 12.

10. The process as claimed in claim 1, wherein the material in the second distilling column is stabilized by the introduction thereinto of a solution of p-quinone and methanol in acetic acid and of minor proportions of air.

11. The process as claimed in claim 1, wherein the evaporation in the thin layer evaporator is effected under a pressure of about 40 mm of mercury.

12. The process as claimed in claim 1, wherein the acrylic acid is distilled in the third distilling column under a pressure of about 40 mm of mercury and at a reflux ratio of 2.

13. The process as claimed in claim 1, wherein the material in the third distilling column is stabilized by the introduction into the head of the column of a solution of p-quinone in acrylic acid.

* * * * *